United States Patent [19]

Kempf

[11] Patent Number: 5,375,962
[45] Date of Patent: Dec. 27, 1994

[54] ENCLOSED PASSENGER LIFT SUITABLE FOR USE IN A VEHICLE HAVING A FIXED PASSENGER ACCESS STEP

[75] Inventor: Dale Kempf, Clovis, Calif.

[73] Assignee: Hogan Mfg., Inc., Escalon, Calif.

[21] Appl. No.: 883,858

[22] Filed: May 15, 1992

[51] Int. Cl.⁵ .............................................. B60P 1/44
[52] U.S. Cl. .................................. 414/541; 414/539; 414/546; 414/921
[58] Field of Search ............... 414/540, 541, 558, 921, 414/539, 545–546, 549; 105/427, 430, 431, 443; 280/166

[56] References Cited

U.S. PATENT DOCUMENTS

| | | | |
|---|---|---|---|
| 3,572,754 | 3/1971 | Fowler | 280/166 |
| 4,027,807 | 6/1977 | Thorley . | |
| 4,029,223 | 6/1977 | Adamski et al. | 414/921 X |
| 4,058,228 | 11/1977 | Hall | 414/549 |
| 4,081,091 | 3/1978 | Thorley | 414/545 |
| 4,083,429 | 4/1978 | Abbott | 187/9 R |
| 4,175,495 | 11/1979 | Kleim | 105/450 |
| 4,273,498 | 6/1981 | Dickhart, III et al. | 280/166 X |
| 4,299,528 | 11/1981 | Kazeil et al. | 414/921 X |
| 4,407,623 | 10/1983 | Parks | 414/921 X |
| 4,420,286 | 12/1983 | Hanson et al. | 414/539 |
| 4,583,466 | 4/1986 | Reddy et al. | 414/921 X |
| 4,685,858 | 8/1987 | Manning et al. | 414/537 |
| 4,909,700 | 3/1990 | Fontecchio et al. | 414/549 |
| 4,958,979 | 9/1990 | Svensson | 414/549 |

FOREIGN PATENT DOCUMENTS 0217467 4/1987 European Pat. Off. ........... 280/166

OTHER PUBLICATIONS

Promotional Material for RICON Wheelchair Lift (3 sheets).

Primary Examiner—Michael S. Huppert
Assistant Examiner—James Keenan
Attorney, Agent, or Firm—Christensen, O'Connor, Johnson & Kindness

[57] ABSTRACT

A vehicle lift for transporting a handicapped passenger between a vehicle and the ground is stowed in an enclosed compartment when the lift is not in use, so that the lift is protected from outside elements such as moisture, dirt, pollution, and snow. Moreover, the lift is suitable for use in a vehicle having a fixed passenger access step. In accordance with the invention, a part of the vehicle staircase is movable between an opened position in which the lift platform is accessible for use to transport a passenger and a closed position in which the lift is enclosed in a compartment beneath the vehicle floor. When the platform is moved to and from the deployed position, the movable part of the staircase is caused to move between the opened and closed positions by a platform-mounted driver that engages a driven member attached to the movable part of the staircase. A biasing member maintains the movable part of the staircase in the opened and closed positions.

12 Claims, 6 Drawing Sheets

ENCLOSED PASSENGER LIFT SUITABLE FOR USE IN A VEHICLE HAVING A FIXED PASSENGER ACCESS STEP

FIELD OF THE INVENTION

The present invention relates to a lift for use in a transit vehicle, and more particularly, to a lift that is stowed in an enclosed compartment to protect against damage from outside elements and that is suitable for use in a vehicle having a fixed passenger access step.

BACKGROUND OF THE INVENTION

A number of lifts have been developed in order to aid handicapped persons, in particular, wheelchair passengers, in boarding and exiting vehicles such as buses, trains, vans, and the like. One type of lift, commonly known as a "platform lift," is disclosed in U.S. Pat. No. 4,058,228 to Hall. The platform lift is designed to be positioned in the stairwell of a vehicle and mounted to the underside of the vehicle frame. The lift is not completely enclosed, and consequently is exposed to outside elements such as moisture, pollutants, dirt, and snow. The lift includes a platform that is slidably mounted beneath the vehicle floor. In an extended position, the platform projects outwardly from the vehicle so that a wheelchair passenger may be carried by the platform. In a stowed position, a part of the platform extends from the vehicle and serves as a step of the passenger access staircase. The platform is attached by a parallelogram linkage assembly to a carriage that is caused to move between extended and retracted positions by a chain drive assembly actuated by a hydraulic or pneumatic actuator. The parallelogram linkage assembly is used to move the extended platform between a vehicle floor-level position and a ground-level position.

Platform lifts of the type described above have been used extensively in buses with very favorable results. Although the lift is exposed to the outside, and thus to environmental elements such as moisture, pollutants, dirt, and snow, this has not been found to be a problem since buses typically are serviced on a relatively frequent basis. Moreover, buses are operated on paved roads and often are used only for relatively short trips. However, in cases in which vehicles have a longer useful life, are serviced less frequently, are operated under conditions that subject the vehicle to impacts from rocks and debris, and/or are used for relatively long trips, it is desirable to provide a lift that is completely enclosed so as to be protected from the environment. For example, a railcar typically has a longer useful life and is serviced less frequently than a bus. Moreover, a railcar is subject to impacts from rocks and debris on railroad tracks and is often used for long trips. In order to protect against damage from outside elements, it is desirable that the lift be completely enclosed when not in use.

Furthermore, a lift of the type having a platform that forms the bottom step of the passenger access stairway is not usable in a vehicle having a fixed passenger access step. For example, some vehicles have a unitary frame structure that includes a ledge in the entryway of the vehicle which serves as a passenger access step. A lift that can be mounted and deployed over the fixed step of the vehicle is desirable.

SUMMARY OF THE INVENTION

The present invention provides a platform-type lift for use with a vehicle having a staircase in an entryway of the vehicle. The lift is stowed in an enclosed compartment so that the lift is protected from outside elements. Access to the lift platform is obtained through a pivotable step in the vehicle staircase. The pivotable step is movable between an opened position in which the step is pivoted to expose an opening in the staircase and a closed position in which the step closes the opening in the staircase. The platform is movable between (1) a stowed position in which the platform is retracted beneath the vehicle floor and the pivotable step is in the closed position, and (2) an extended position in which the platform extends outwardly from the staircase of the vehicle and the pivotable step is in the opened position. The step is caused to open and close by a driver, e.g., a pin rack, attached to the platform and a driven member, e.g., a sprocketed member, attached to the pivotable step. As the platform moves to the extended position, the driver engages the driven member and causes the pivotable step to move to the opened position such that the extended platform passes through the opening in the staircase. Similarly, the driver engages the driven member and causes the pivotable step to move to the closed position as the platform is retracted through the opening in the staircase.

The present invention provides a lift that is completely enclosed and thereby protected from the environment, has simple construction, and is highly reliable. Moreover, the lift may be deployed over a vehicle step, and thus is suitable for use in vehicles having a fixed step.

BRIEF DESCRIPTION OF THE DRAWINGS

The invention will be described with reference to the accompanying drawings, wherein:

FIG. 8 is a side view of a compartment in which a lift in accordance with the present invention may be enclosed when the lift is in the stowed position.

DETAILED DESCRIPTION OF THE PREFERRED EMBODIMENT

Figure 1:
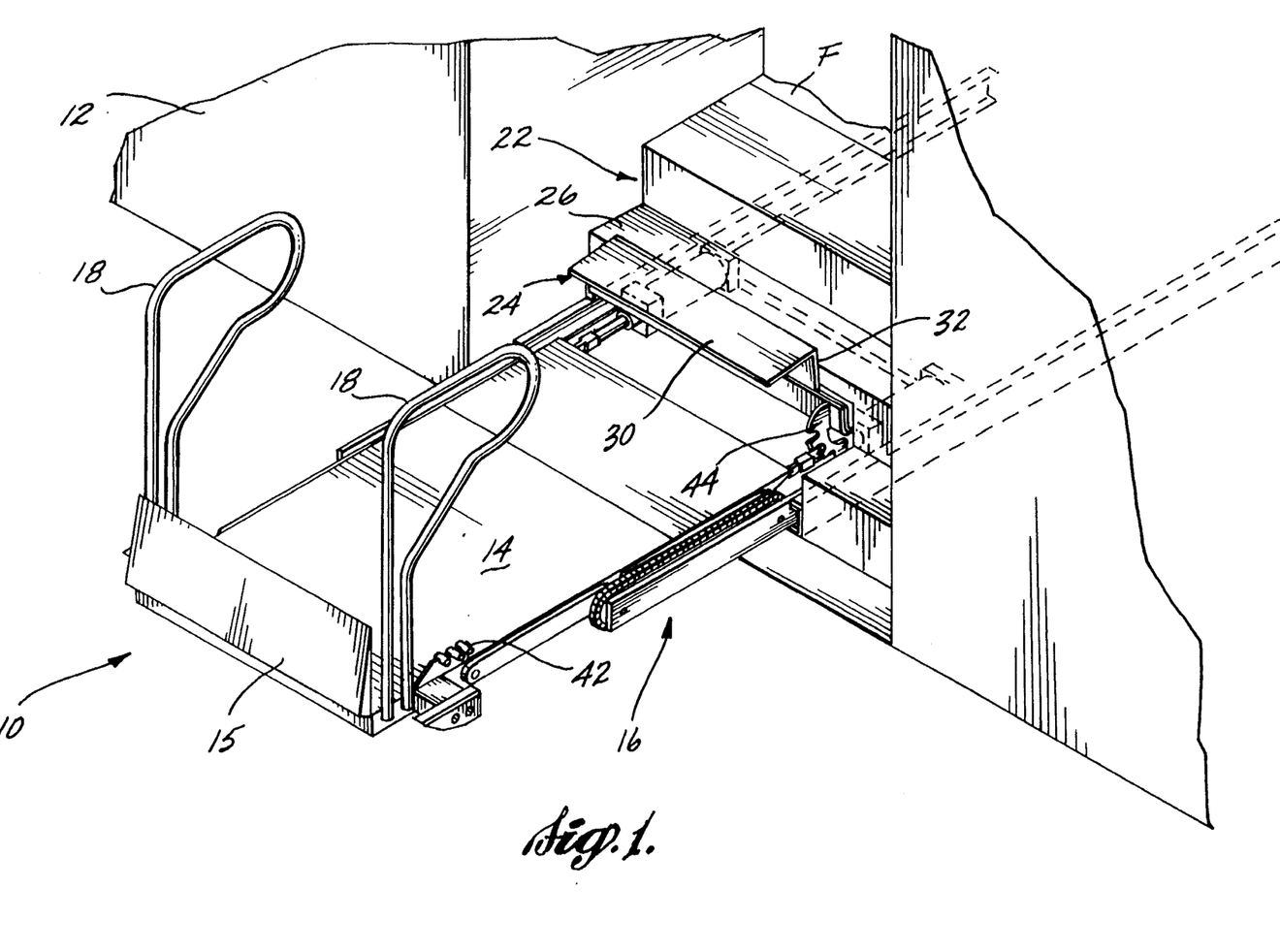
FIG. 1 is a perspective view of a lift in accordance with the present invention, installed in an entryway of a vehicle, with the pivotable step in the opened position and the platform extended.
Figure 2:
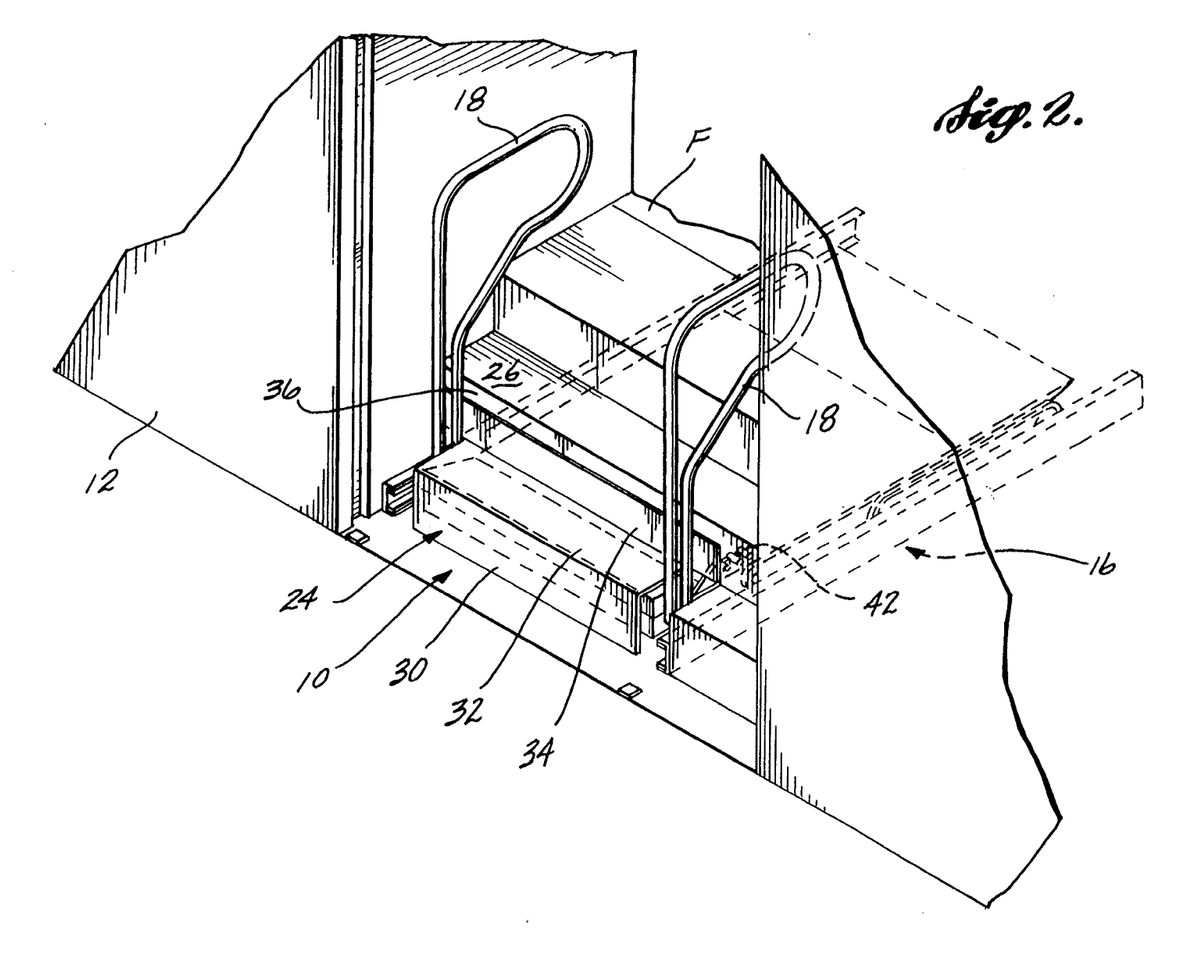
FIG. 2 is a view of the lift shown in FIG. 1 with the pivotable step in the closed position and the platform retracted.

FIGS. 1 and 2 show a lift 10 in accordance with the present invention as used in a vehicle 12. The lift 10 is situated in the entryway of the vehicle 12 in an enclosed compartment 20 (FIG. 8) beneath the vehicle floor F and is operable to transport a passenger between ground-level and vehicle floor-level. The lift 10 is a platform lift of the type disclosed in U.S. Pat. No. 4,058,228 to Hall ("the '228 patent"). For details regarding the structure of the lift 10, one should refer to the '228 patent, which is herein incorporated by reference. The lift 10 includes a platform 14 connected to a carriage assembly 16. A chain drive assembly (not shown) attached to the carriage assembly 16 is used to move the platform 14 between a stowed position in which the platform 14 is retracted completely within the compartment 20 and an extended position in which the platform 14 extends from the vehicle 12 for use to transport a handicapped passenger between the vehicle and the ground. A ramp 15 is connected at the outboard end of the platform 14 and is movable between a ramp position in which the ramp 15 is extended from the platform 14 to facilitate boarding and exiting of the platform 14 by a wheelchair passenger and a barrier position in which the ramp 15 extends substantially vertically from the platform 14 to prevent a wheelchair passenger from rolling off of the platform 14. Handrails 18 are also provided.

The illustrated embodiment shows a staircase 22 having a lower step 24 that is pivotable and an adjacent step 26. However, the staircase 22 may have any number of steps, and any part of the staircase 22 may be configured so as to be pivotable. The pivotable step 24 is made from metal plate stock in a conventional manner and has a first riser portion 30, a tread portion 32, and a partial second riser portion 34 adjacent a riser portion 36 of the adjacent step 26. The pivotable step 24 is coupled to the lift 10 such that the pivotable step 24 may be moved between a closed position as shown in FIG. 3 and an opened position as shown in FIG. 4.

As shown in FIG. 8, the lift 10 is enclosed in the compartment 20 formed by enclosing members provided at the top T, bottom B, rear R, and sides S (only one of which is visible in FIG. 8) of the lift, and pivotable step 24 which closes off the front of the lift. The enclosing members are formed from metal stock and may either be formed as part of the lift frame structure or may be fastened to the lift frame structure in a conventional manner, for example, with bolts or by welding. An arrangement in which the slide channels 28 of the carriage assembly form the enclosing members on the sides S of the lift, a cross-member of the lift frame structure forms the enclosing member on the rear R of the lift, and the enclosing members on the top T and bottom of the lift are separate from the lift frame structure has been found preferable. The compartment 20 may be formed by any number of enclosing members, and any or all of the enclosing members may be made removable to provide access to the lift for maintenance purposes. Fastening supports 23, for example, made from metal angle stock, are provided for attaching the lift to a vehicle frame, for example, with bolts.

When the pivotable step 24 is in the closed position (FIGS. 2 and 3), the entire lift 10, except for the handrails 18, is enclosed in the compartment 20 and thus is protected from outside elements such as dirt, pollution, moisture, and snow. When it is desired to use the lift 10 to transport a handicapped passenger between the vehicle 12 and the ground, the platform 14 is deployed, and a driver 42 coupled to the platform 14 engages a driven member 44 attached to the pivotable step 24 such that the pivotable step 24 is opened (FIGS. 1 and 4) as the platform 14 is deployed. When the platform 14 is retracted, the driver 42 engages the driven member 44 such that the pivotable step 24 is closed. Thus, movement of the platform 14 to and from the deployed position is used to open and close the pivotable step 24.

Figure 3:
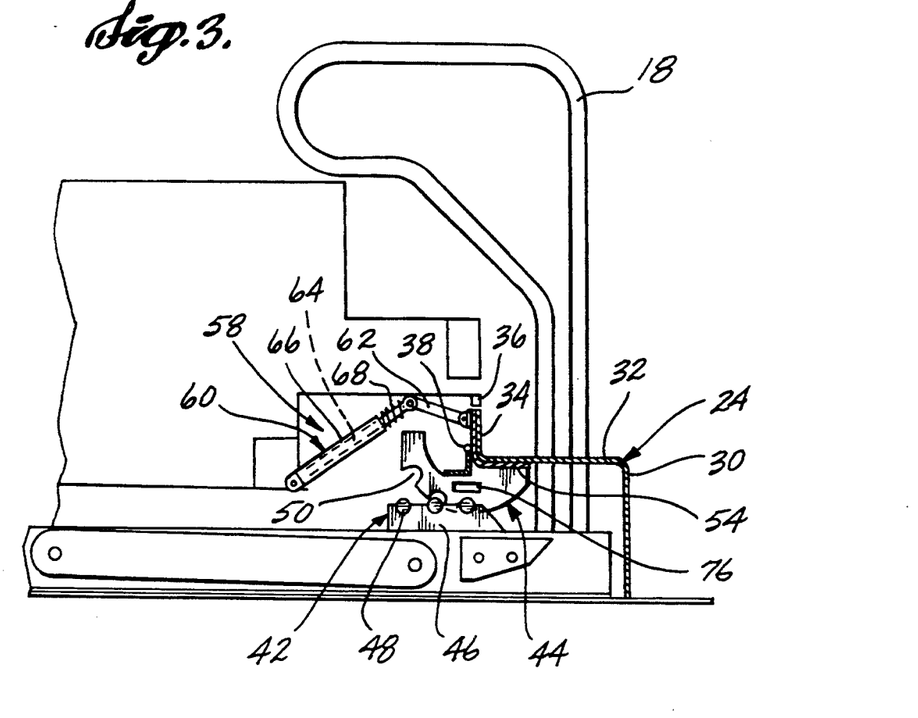
FIG. 3 is a partial side view of the lift, showing the pivotable step and means for opening and closing the pivotable step, with the pivotable step in the closed position.
Figure 4:
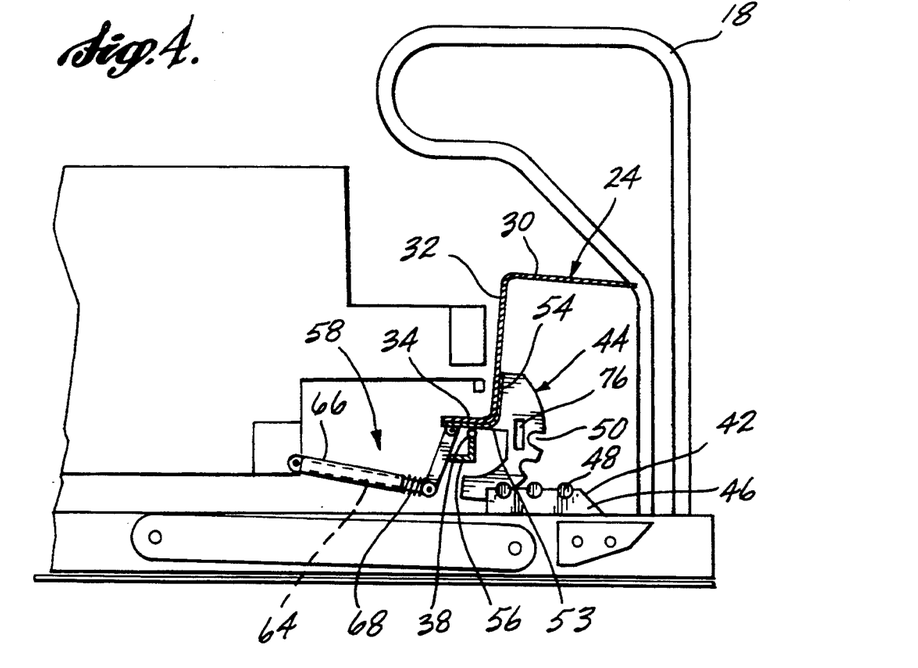
FIG. 4 is the same view as FIG. 3, with the pivotable step approaching the opened position.

As best seen in FIGS. 3 and 4, the driver 42 includes a base 46 having a plurality of pins 48 that engage respective openings 50 in the driven member 44. The base 46 is provided with semi-circular openings to receive the pins 48 and is made, for example, from metal plate stock. The base 46 is attached to the platform 14 in a conventional manner, e.g., by way of bolts, so that the driver 42 moves with the platform 14. The pins 48 project outwardly from the base 46 for engagement with the openings 50 in the driven member 44. The pins 48 are made from, e.g., metal rod stock, and are attached to the base 46 in a conventional manner, for example, by welding.

As noted above, the driven member 44 is provided with openings 50 that engage respective pins 48 on the driver 42. The driven member 44 has an arc portion around which the openings 50 are arranged. The driven member 44 is attached, for example, by welding, to an angle member 54 that is attached in a conventional manner to the pivotable step 24 at the tread portion 32 and the second riser portion 34 as shown in FIGS. 3 and 4. A hinge 38, attached to the angle member 54, joins the pivotable step 24 to a cross-member 56 of the lift frame structure.

When the pivotable step 24 is in the closed position, the forward pin of the driver 42 engages the forward opening of the driven member 44. As the platform 14 is deployed, the forward pin initially drives the driven member 44 and begins upward movement of the pivotable step 24. Then the intermediate and rearward pins of the driver 42 engage the intermediate and rearward openings of the driven member 44, respectively, to move the pivotable step 24 to the opened position. The pivotable step 24 is pivoted up and out of the way before the platform is deployed significantly and is pivoted to and maintained in the fully opened position before the platform 14 is extended beyond the plane of the first riser portion 30. The pivotable step 24 moves approximately 90 degrees between the opened and closed positions. Movement of the pivotable step 24 to the closed position is achieved in a similar manner except that the pins 48 drive the driven member 44 in reverse order, that is, the rearward pin initially engages the rearward opening to drive the driven member 44, and then the intermediate and forward pins engage the intermediate and forward openings, respectively, to drive the driven member 44.

Figure 6:
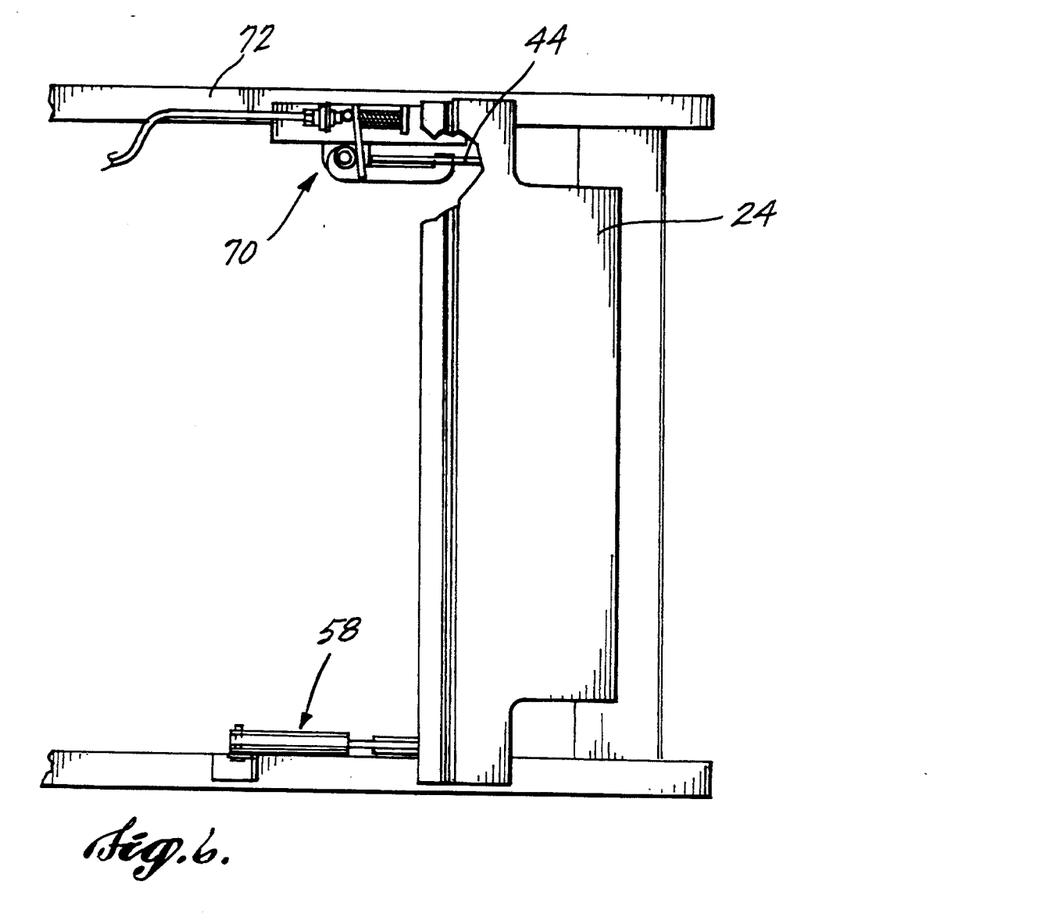
FIG. 6 is a partially cut-away partial view of the top of a lift in accordance with the present invention, showing the relative positions of the driven member, stow latch, and biasing means.

A biasing means 58 is operatively connected to the pivotable step 24 for maintaining the pivotable step 24 in the opened and closed positions. As shown in FIG. 6, the driven member 44 and the biasing means 58 are situated at opposite sides of the lift. The biasing means 58 comprises a toggle joint having a first arm 60 pivotally connected at one end to a second arm 62 (FIGS. 3 and 4). The other end of the first arm 60 is pivotally connected to one of the slide channels 28. The first arm 60 has a rod member 64 that fits in a sleeve member 66.

A compression spring 68 is provided over the rod member 64 for maintaining a compressive force against the second arm 62. A spring having a spring rate of eighty-five pounds/inch has been found to perform well. The other end of the second arm 62 is attached to the backside of the second riser portion 34 of the pivotable step 24 through the angle member 54 in a conventional manner, for example, by bolts.

As the pivoting step 24 approaches the fully opened position, the biasing means 58 urges the pivoting step 24 upward so that the forward tooth associated with the rearward opening of the driven member 44 is raised out of the path of the rearward pin on the driver 42. Thus, when the platform 14 is subsequently retracted to the stowed position, the rearward pin on the driver 42 travels freely under the forward tooth and into the rearward opening of the driven member 44 rather than jamming against the forward tooth. Also, the biasing means maintains the pivotable step 24 in the opened position after the driver 42 has disengaged from the driven member 44.

Figure 7:
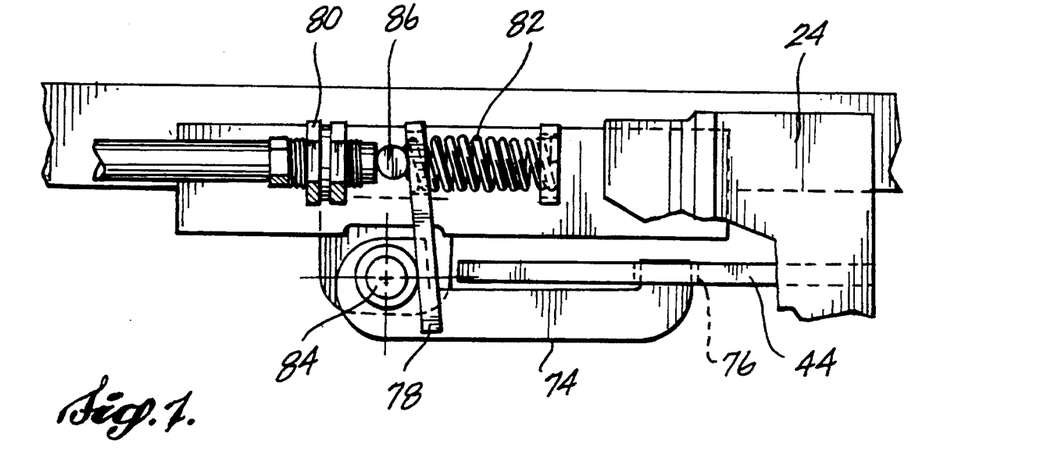
FIG. 7 is a close-up view of the stow latch shown in FIG. 6.

Latching of the platform 14 in the stowed position is obtained via a stow latch 70 mounted to one of the slide channels 28 adjacent the driven member 44 (FIG. 6). The stow latch 70 includes a latching member 74 movable between a latched position in which the latching member 74 engages a recess 76 in the driven member 44 and an unlatched position in which the latching member 74 does not engage the recess 76 in the driven member 44. As noted previously, when the platform 14 is in the stowed position, the forward opening of the driven member 44 engages the forward pin of the driver 42. Thus, when the platform is in the stowed position and the latching member 74 engages the recess 76 in the driven member 44, the driver 42, and thus the platform 14, is locked in position. The latching member 74 is caused to move between the latched and unlatched positions by way of an arm 78 attached to the latching member 74, for example, by welding, a one-way actuator 80, and a spring 82. The one-way actuator 80 is a conventional actuator such as a hydraulic or pneumatic cylinder. The arm 78 is operable to pivot the latching member 74 about a pin 84. When the actuator 80 is actuated, the arm 78, via a rod member 86 provided for improved contact, is caused to move such that the latching member 74 is disengaged from the recess 76 in the driven member 44 such that the platform is not latched in position. When the actuator 80 is de-actuated, the spring 82 moves the arm 78 such that the latching member 74 engages the recess 76 in the driven member 44. In this manner, the platform is locked in the stowed position and the pivotable step 24 is locked in the closed position.

The stow latch actuator 80 may be configured to be pressurized from the stow/deploy actuator (not shown) for the lift. In that case, the stow latch actuator 80 is de-energized once the lift is fully deployed. The latching member 74 may be configured to swing behind the driven member, thereby preventing accidental downward movement of the pivotable step 24 from the opened position. Thus the pivotable step 24 may be maintained in the opened position by both the biasing means 58 and the stow latch 70. When the stow/deploy actuator for the lift is energized to stow the lift, the stow latch actuator 80 is energized, and the latching member 74 swings clear of the driven member 44.

When the lift is installed in a vehicle having sliding doors and a fixed access step, as shown in FIGS. 1 and 2, it has been found preferable to attach support blocks 77 at the edge of the fixed step in the path of the platform slides. In the platform lift disclosed in the '228 patent, the slide channels support the linkage arms of the parallelogram linkage assembly when the platform is above stow height. However, in a vehicle having sliding doors and a fixed step, the slide channels 28 cannot extend to the edge of the fixed step since the sliding doors are positioned inboard of the step. The support blocks 77 serve to support the linkage arms 79 of the parallelogram linkage assembly when the platform is above stow height. Also, the support blocks 77 may be configured so as to guide the sliding doors of the vehicle.

Figure 5:
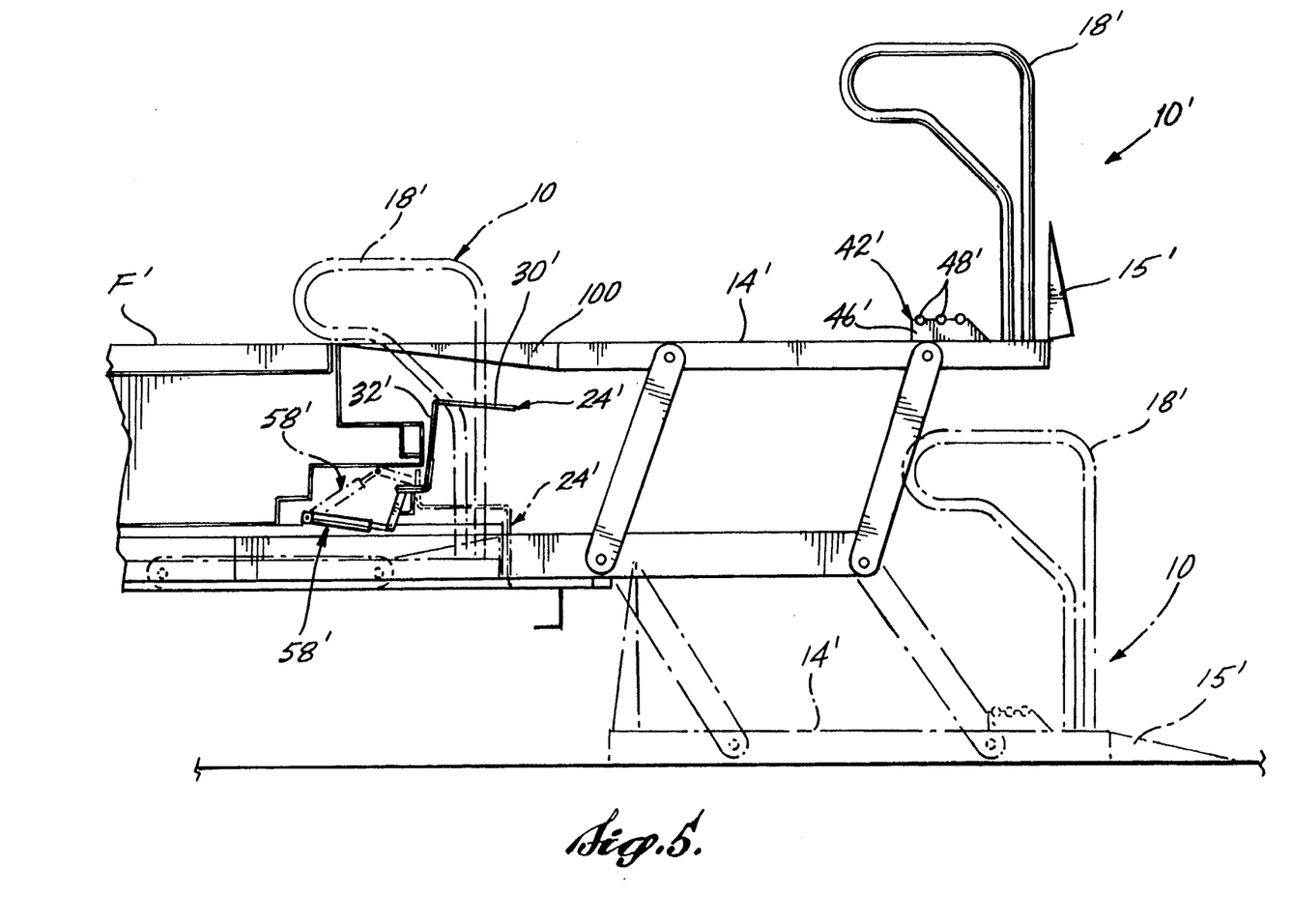
FIG. 5 is a partial side view of a lift embodiment including a bridge member, for use in situations in which there is a gap between the platform and the vehicle floor when the platform is at vehicle floor-level height, with the extended platform at vehicle floor-level shown in solid and the extended platform at ground-level shown in phantom.

FIG. 5 shows an embodiment of the present invention adapted for use in vehicles having a structure that limits lift deployment such that the platform cannot be positioned directly adjacent the vehicle floor. The reference numerals in FIG. 5 are designated with a prime (') to indicate that the illustrated device is a further embodiment; otherwise, like reference numbers used in other figures refer to like parts. In a platform lift of the type disclosed in the '228 patent, movement of the platform is limited by the parallelogram linkage assembly. Depending on the configuration of the vehicle, it may not be possible to move the platform directly adjacent the vehicle floor. For example, when the lift must be deployed over a vehicle bottom step as shown in FIG. 1, it generally is not possible to position the platform directly adjacent the vehicle floor. To solve this problem, the embodiment shown in FIG. 5 is provided with a movable bridge member 100. When the platform 14' is at vehicle floor level height, as shown in solid view in FIG. 5, the bridge member 100 is extended to bridge the gap between the vehicle floor F' and the platform 14'. The bridge member 100 is moved to an upright position (phantom view in FIG. 5) to serve as a protective barrier when a passenger is being carried on the platform 14'. When the lift is in the stowed position (not shown), the bridge member 100 is in the extended position. The bridge member 100 is actuated by a conventional actuator (not shown), for example, a hydraulic or pneumatic cylinder, attached to the platform assembly.

The general operation of a lift in accordance with the embodiment of the present invention illustrated in FIG. 5 will now be described. When the lift is in the stowed position and it is desired to deploy the lift platform for use to transport a handicapped passenger, the vehicle operator selects "LOWER" on the operator control panel (not shown). When "LOWER" is selected, the stow latch is unlatched, and the platform is deployed. The bridge member is then rotated from the bridge position to the barrier position, and the ramp member is rotated from the stowed position to the barrier position. The platform is lowered to ground level, and the ramp is then moved from the barrier position to the ramp position so that a passenger may board the platform.

Once the passenger has boarded the platform, the vehicle operator selects "RAISE" on the operator control panel. When "RAISE" is selected, the ramp member is rotated to the barrier position, and the platform is raised to vehicle floor-level. When the platform is at vehicle floor-level, the bridge member is rotated from the barrier position to the bridge position. The passenger may then exit the platform and board the vehicle.

In order to stow the lift, the vehicle operator selects "STOW" on the operator control panel. When "STOW" is selected, the bridge member is rotated from the bridge position to the barrier position. The platform is lowered to stow height. The ramp is rotated from the barrier position to the stowed position, and the bridge member is rotated from the barrier position to the bridge position. The lift is retracted into the stowed position, and the stow latch is returned to the latched position.

The presently contemplated best mode of carrying out the invention has been described above. Nevertheless, it should be understood that various modifications can be made therein without departing from the spirit and scope of the invention. For example, although the use of a pivotable step has been described in conjunction with a lift that is enclosed in a compartment for protection from outside elements, a pivotable step in accordance with the present invention may be used with a lift that is not enclosed. Moreover, although the present invention has been described with reference to a platform lift of the type disclosed in the '228 patent, the present invention may be used with vehicle lifts having different structure and operation. Also, although the preferred embodiment uses a pin rack and a sprocketed member to open and close the pivotable step, other drive configurations may be used. Furthermore, although the preferred embodiment pivots one complete step and part of an adjacent step, more or less of the staircase may be made movable.

The embodiments of the invention in which an exclusive property or privilege is claimed are defined as follows:

1. A lift for use with a vehicle having a staircase in an entryway of the vehicle, the staircase including a pivotable step movable between an opened position in which the step is pivoted to expose an opening in the staircase and a closed position in which the step closes the opening in the staircase, the lift comprising:
   a platform having an inboard end and an outboard end, the platform being movable between (a) a stowed position in which the platform is retracted beneath the vehicle floor and the pivotable step is in the closed position, and (b) an extended position in which the platform is extended for use to transport a passenger and the pivotable step is in the opened position;
   a driver attached to the platform; and
   a driven member attached to the pivotable step;
   the driver and the driven member cooperating to move the pivotable step to the opened position as the platform moves to the extended position, and the driver and the driven member cooperating to move the pivotable step to the closed position as the platform moves to the stowed position, the platform remaining substantially horizontal as the driver and the driven member cooperate to move the pivotable step between the opened and closed positions.

2. A lift as set forth in claim 1, further comprising:
   a bridge member pivotally connected to the inboard end of the platform and movable between a bridge position in which the bridge member is substantially coplanar with the platform and a barrier position in which the bridge member is substantially vertical relative to the platform.

3. A lift as set forth in claim 1, wherein the driven member is provided with a recess therein, and the lift further comprises a stationary support member and a stow latch mounted to the stationary support member and movable between (a) a latched position in which the stow latch engages the recess in the driven member, and (b) an unlatched position in which the stow latch does not engage the recess in the driven member.

4. A lift as set forth in claim 1, further comprising biasing means for biasing the pivotable step when the pivotable step is in one of the opened and closed positions.

5. A lift as set forth in claim 4 wherein the biasing means comprises a spring.

6. A drive assembly for use with a lift in a vehicle having a staircase in an entryway of the vehicle, the staircase including an access member in the vehicle staircase that can be moved between (a) an opened position in which the access member is opened to expose an opening in the staircase, and (b) a closed position in which the access member is closed to conceal the opening in the staircase and the access member forms a part of the staircase, the lift including a platform that may be moved between (a) a stowed position in which the platform is retracted beneath the floor of the vehicle and the access member is in the closed position, and (b) an extended position in which the access member is in the opened position and the platform extends through the opening in the staircase, the platform remaining substantially horizontal as the access member is moved between the opened and closed positions, the drive assembly comprising:
   a driver operatively connected to the platform; and
   a driven member operatively connected to the access member;
   the driver and the driven member cooperating to move the access member to the opened position as the platform moves to the extended position, and the driver and the driven member cooperating to move the access member to the closed position as the platform moves to the stowed position.

7. A drive assembly as set forth in claim 6, wherein the driver comprises pins and the driven member comprises openings for engaging the pins.

8. A transport system designed to be installed in an entryway of a vehicle for moving an object between a raised position adjacent the floor of the vehicle and a lowered position adjacent the ground next to the vehicle, the system comprising:
   stair means designed to be installed in the entryway of the vehicle for accessing the vehicle;
   a vehicle lift, comprising:
   a platform having an inboard end and an outboard end and being movable between a stowed position in which the platform is retracted within the entryway of the vehicle and a deployed position in which the platform extends beyond the entryway of the vehicle for use to transport a handicapped passenger between the vehicle and the ground;
   a driver operatively connected to the platform; and
   a driven member operatively connected to the stair means; and
   enclosing members situated at the top, bottom, rear, and sides of the lift, the stair means and the enclosing members forming an enclosure that surrounds the lift;
   the stair means being movable between (a) an opened position in which an opening in the enclosure is formed through which the platform may be extended and (b) a closed position in which the lift platform is not accessible for use to transport a passenger; and the driver and the driven member cooperating to move the stair means to the opened position as the platform moves to the deployed position, and the driver and the driven member cooperating to move the stair means to the closed position as the platform moves to the stowed position, the platform remaining substantially horizontal as the driver and the driven member cooperate to move the stair means between the opened and closed positions.

9. A transport system as set forth in claim 8, wherein the driver comprises pins and the driven member comprises openings to engage the pins.

10. A transport system as set forth in claim 8, further comprising:
a bridge member pivotally connected to the inboard end of the platform and movable between a bridge position in which the bridge member is substantially coplanar with the platform and a barrier position in which the bridge member is substantially vertical relative to the platform.

11. A transport system as set forth in claim 8, wherein the driven member is provided with a recess therein, and the lift further comprises a stationary support member and a stow latch mounted to the stationary support member and movable between (a) a latched position in which the stow latch engages the recess in the driven member, and (b) an unlatched position in which the stow latch does not engage the recess in the driven member.

12. A transport system as set forth in claim 8, further comprising biasing means for biasing the stair means when the stair means is in one of the opened and closed positions.

* * * * *